United States Patent Office

3,243,426
Patented Mar. 29, 1966

3,243,426
PROCESS OF MAKING CATIONIC STARCH AND
RESULTING PRODUCT
George V. Caesar, P.O. Box 8, Harbor Beach, Mich.
No Drawing. Filed July 27, 1962, Ser. No. 213,057
5 Claims. (Cl. 260—233.3)

This invention relates to a method for the etherification of starch with a cationic etherifying agent to form a starch derivative known in the art as "cationic starch." The invention comprises the manufacture of ethers of starch wherein the substituent radical contains a tertiary or quaternary nitrogen group. All of the etherifying agents, the use of which is included in this invention, have in common their ability to react with the hydroxyl groups of the starch to form an ether linkage under the conditions of the reaction to be described later, thereby introducing the tertiary or quaternary nitrogen radical chemically into the starch molecule. The presence of the tertiary or quaternary nitrogen radical imparts a positive charge to the starch molecule or micelle when the starch is dispersed in an aqueous medium in subsequent conditions of use.

By the term "starch" is meant any amylaceous substance, examples of which are corn, wheat, potato, tapioca, maize, sago and rice starches which may be in their original untreated form or may be dextrinized or otherwise modified as long as they still retain their granular character.

In accordance with this invention, the starch in its characteristic discrete microscopic granule form is suspended in a water-immiscible inert fluid medium so that the individual starch molecules or micelles can enter into the reaction described in substantially the solid state without undergoing a change in physical appearance. The above-mentioned medium is also inert with respect to the etherifying agent, the catalyst and any other component introduced into the reaction, as well as to the reaction product.

The suspension of the starch granules in the inert medium can be accomplished in any manner, such as stirring, tumbling, pumping or any other motion-imparting process which will prevent them from settling and keep them in a state of suspension within the medium. The state of agitation is not critical and any extent which will keep the particles in a state of suspension and bring them into contact with the catalyst and etherifying agent to be described later is adequate.

The medium may be any fluid which fulfills the above requirements, i.e., with respect to which the starch, the etherifying agent, the catalyst and the final product are inert and also not appreciably soluble.

Since it is the physical and known properties of the fluid which are determinative of its suitability, one skilled in the art will be able to determine from the literature which fluids are suitable. Examples are any hydrocarbon which is fluid under the reaction conditions. If the reaction is conducted under pressure, lower boiling point hydrocarbons are suitable, but inasmuch as it is preferred to conduct the process under atmospheric pressure the preferred hydrocarbons have a boiling point above ambient temperatures but do not boil so high that they cannot be readily removed from the final product without undue heating. If the removal of the fluid is accomplished by vacuum, of course, higher boiling fluids may be employed. The aliphatic hydrocarbons are preferred. Preferred examples include pentane, hexane and heptane and any of their isomers. Aromatic hydrocarbons, such as benzene, toluene, may be employed but because of odor considerations they are less desirable. Cycloaliphatics, such as cyclopentane are also suitable, but are generally less available and more expensive. Mixtures of hydrocarbons, such as commonly employed as dry cleaning solvents (Stoddard solvent), petroleum ethers, naphthas, as generally available in the industry, can be used. These generally are predominantly aliphatic hydrocarbons but may be mixtures including aromatics and other hydrocarbons.

In addition to the hydrocarbons, materials having essentially the same physical properties may be used, including halogenated hydrocarbons such as carbon tetrachloride, trichloroethylene and chloroform and the Freons. Higher boiling materials, such as tetrachloroethylene, and the octanes may be employed if care is taken in their separation from the final products, such as by vacuum evaporation. Inasmuch as my process contemplates the recovery and repeated re-use of medium, the facility for separating it from the final product for re-use is an important consideration in selecting the fluid medium.

The fluid medium should preferably have a boiling point within the range of about 40 to 100° C. Fluids boiling below this result in excess loss and present problems in recovery and re-use, and fluids above this similarly present difficulties in removal from the finished product. Within this range, I prefer materials boiling within the range of chloroform to the isomeric heptanes, namely from approximately 60 to 85° C.

The illustrative and preferred cationic etherifying agents fall into two general groups. The first is the tertiary amine and quaternary ammonium halides. The tertiary amine halides have the general formula:

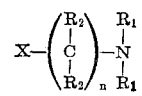

or

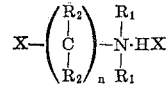

in which $R_1$ may be any alkyl or substituted alkyl group having 1 to 8 carbon atoms, preferably 1 to 4 carbon atoms, and either of $R_2$ may be hydrogen or $R_1$. The alkyl groups need not all be the same and may be different from one another. X may be any non-fluoride halide, such as chlorine, bromine or iodine. The integer $n$ may be 1 to 4. Some of the examples of compounds within the above formula which are useful in carrying out the invention are dimethyl amino ethyl chloride, diethyl amino ethyl bromide, dimethyl amino isopropyl iodide, butyl methyl amino ethyl chloride or the hydro-halide salts.

The quaternary ammonium halides have the general formula:

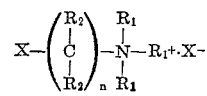

where $R_1$, $R_2$, X and $n$ are as defined above.

Examples are 2-chloroethyl tri-methyl ammonium chloride, 1-bromomethyl triethyl ammonium bromide, 2-iodoethyl triethyl ammonium chloride.

If the starch molecule or micelle is represented by the formula R—OH in which OH is an etherifiable hydroxy group of the starch molecule, the reaction can be represented as follows when caustic soda is the catalyst:

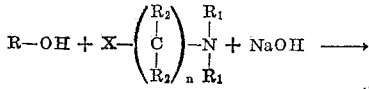

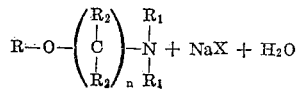

The other group of etherifying agents comprise the tertiary amine and quaternary nitrogen compounds containing an epoxy group and which have the following general formulae:

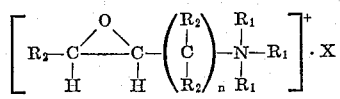

and

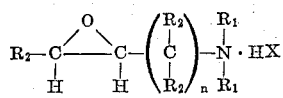

respectively, where $R_1$, $R_2$, $n$ and X are defined as above. Examples are 2,3-epoxy-propyl trimethyl ammonium chlorides, 3,4-epoxybutyl triethyl ammonium bromides, 2,3-epoxybutyl methyldiethyl ammonium iodide, 2,3-epoxypropyltriethyl ammonium chloride, 2,3-epoxypropyl dimethyl amine hydrochloride and 3,4-epoxy butyl diethylamine bromide. The cationic etherifying agents useful herein are preferably employed in the form of a 25 to 75% aqueous solution.

Assuming starch to have the formula R—OH as described above the reaction with the quaternary amino compounds can be illustrated as follows:

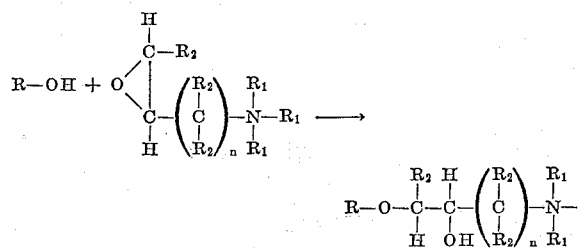

The reaction between the starch and the etherifying agent is carried out in the presence of an alkaline catalyst which preferably is a caustic alkali, such as sodium hydroxide and potassium hydroxide. Other compounds which have a similar or high degree of basicity are equivalent and may be used, but economic considerations and the experience of the art dictate a strong preference for caustic alkali. Catalysts for the etherification of starch are well known in the art.

The relative amount of the catalyst based on the starch is about 1 to 10% on a dry basis, preferably about 5% but which may vary plus or minus 2%. The amount will depend somewhat on the amount of the etherifying agent and the speed of reaction desired. Large amounts increase the rate of reaction but add to the salt content of the finished product.

The catalyst is introduced as a relatively concentrated aqueous solution, preferably as high a concentration as practical, i.e., in the range of 25 to 50% or greater. By utilizing a concentrated solution, the amount of water introduced is kept sufficiently low so that the water, even in the presence of the caustic, does not cause the starch to gelatinize or otherwise alter its usual physical microscopic granular appearance. At all events the amount of water introduced with the caustic (and with the etherifying agent) should be less than the amount that the starch can absorb and hold in a granular form under the reaction conditions without having a third water phase present or without forming a paste or slime.

The amount of etherifying agent will depend on the extent of the cationic properties to be imparted to the starch. Theoretically, three hydroxy groups for each anhydroglucopyranose unit (AGU) of the starch chain can be etherified. The degree of substitution (DS) is 1.0 when one hydroxy group in each AGU is etherified, and 3 when three hydroxy groups of each AGU are etherified. In accordance with my invention, it is practical to achieve a DS of from .01 to .5. However, the cationic property imparted to the starch is not believed to be a straight line function of the etherification and falls off as the DS increases. Considering the relative cost of the etherifying agent, in relation to the properties achieved, relatively low DS values of from .02 to .1 are the most commercial practical values.

The reaction temperature may vary from ambient temperatures up to just below the boiling point of the solvent employed under the pressure conditions. The temperature does not appear to be critical except that with the lower reaction temperatures longer reaction times are required, and vice-versa to avoid alkaline degradation. A range of 30° C. to 80° C. is a practical range.

The reaction time may vary from one minute to one hour. At the higher temperatures exceedingly short reaction times are possible, such as of the order of 5 to 10 minutes which is in marked contrast to the long reaction times required for cationic starch in aqueous reaction medium reported in a prior patent as 17 hours at 40° C.

The process may be carried out at atmospheric pressure, but if the fluid medium has a low boiling point, or if a reaction temperature above the boiling point is desired, super atmospheric pressure may be employed to minimize the loss of the medium.

The relative proportions of the starch and the fluid medium should be such that the starch does not impart any substantial thickening action to the mixture so that it may be maintained in a highly fluid state with the starch granules uniformly suspended and at such dilution as to promote contact with the reaction components. Generally from one part by weight of starch to 2 to 10 parts of the fluid medium is practical.

The ingredients may be placed in the fluid medium in any order as long as they are all brought in contact with each other ultimately for a time to permit tthe reaction to proceed under the reaction conditions. I prefer, however, to suspend the starch in the fluid medium, then add the catalyst, and then add the etherifying agent and permit the reaction to go to completion during the suspension of all of the ingredients in the inert fluid.

After the reaction is complete, it is desirable, especially if an excess of caustic has been employed, to neutralize the caustic so that the final product upon dispersion may have a pH within the range of 4 to 8.5. Any acid may be employed for this purpose, such as sulfuric, hydrochloric, phosphoric or any organic such as acetic, oxalic, citric, etc. The acid should be substantially anhydrous or at any event the amount of water introduced with it, taken together with the water introduced with the caustic and the etherifying agent, should be within the power of the starch to hold the same. I prefer glacial acetic acid because the sodium acetate thus formed has a plasticizing as well as a preservative action on the starch.

After the neutralization is complete, the slurry is filtered or centrifuged to separate the starch granules from the fluid medium which can be returned for re-use. If desired, it may occasionally be redistilled to purify it. The resulting cationic starch ether is dried to remove the residual fluid medium and the latter can be recovered during the drying operation for re-use. A part or all of the added water can also be removed during the drying.

The final product is an ungelatinized material comprising discrete starch particles which can be readily powdered to a condition resembling the original untreated starch product.

Inasmuch as all of the reaction components are insoluble in the reaction medium as is also the case of the final product, there is no opportunity for loss of reactants or product and all of the ingredients introduced are present in the final product. This is in contrast with an aqueous reaction or one in which there is an aqueous phase in which some or all of the ingredients are soluble and which would be carried away with the aqueous phase.

The following examples constitute the best mode contemplated for carrying out the invention:

Example I 100 grams of tapioca flour having a normal moisture content of 12% was dispersed in 500 ml. of carbon tetrachloride at room temperature utilizing a Waring Blendor which maintained the starch in uniform suspension because of the efficient mixing action. 6.6 ml. of a 50% aqueous caustic soda solution (equivalent to approximately 5 grams of NaOH on a dry basis) was added slowly druing the mixing. The starch remained suspended as discrete granules and was microscopically similar to its original form, although the concentration of the caustic soda solution adsorbed was around 23%, taking into account the moisture present in the original starch. Under normal circumstances, the mixing of this amount of concentrated caustic would have caused gelatinization of the starch and the formation of slimey lumps. During the addition of the caustic solution, the temperature of the slurry rose from around 20° C. to 30° C. Next was added to the stirred mixture a 50% aqueous solution of 2,3-epoxypropyltrimethyl ammonium chloride in an amount equivalent to 2.3 grams of the dry etherifying agent and the stirring was continued. During the first five minutes the temperature rose to about 54° C. and was maintained at this temperature for an additional 15 minutes. At the completion of the reaction 7.5 ml. of glacial acetic acid was added and the stirring continued. The slurry was then filtered freely while hot. The filter cake was crumbled and dried under an infrared lamp for about one hour when the product had the dry texture of the original starch. The calculated degree of substitution (DS) was 0.025. The product was gelatinized by forming an aqueous 5% suspension and cooked by heating to a temperature of 80° C. The resulting solution was suitable for use as a wet-end paper making additive.

Although the degree of substitution was relatively low, the initial gelatinization temperature was 55° C. compared with an initial gelatinization temperature of the untreated starch of 60° C. This is a significant change considering the relatively low degree of substitution.

The rheological property of this product at the calculated DS of 0.025 when tested as a 5% concentration in water and cooked to a temperature of 80° C. and slowly cooled were:

|  | Brookfield Viscometer at— | | | |
| --- | --- | --- | --- | --- |
|  | 6 r.p.m. | 12 r.p.m. | 30 r.p.m. | 60 r.p.m. |
| At 65.5° C., cps | 5,700 | 3,500 | 1,920 | 1,280 |
| At 20° C. and 24 hrs. old, cps | 12,500 | 8,200 | 4,900 | 3,100 |

The above increases in viscosity from hot to cold are much less than are the case for a 5% concentration of unsubstituted tapioca flour when cooked in the same manner, which is a favorable industrial property. At 6 r.p.m. and 65.5° C. the unsubstituted tapioca had a viscosity of only 4,500 cps. but when cold it had a viscosity of 24,000 cps.

A method of cationic rating which was utilized in measuring the cationic proporties involved the gain in weights of 2 gram cotton spools immersed in a 0.266% aqueous solution of a cooked cationic starch when the spools were mounted on a cathode and anode separated at about 3″ and impressed with a voltage of 12 volts. The weight gain of the cotton on the anode is subtracted from the weight gain on the cathode to ascertain the net gain. On this basis the product of this example gave a net weight gain of 80 mg. and was rated as having a cationic activity of 80⊕.

Example II

The proportions and procedures of Example I were repeated except that the etherizing reactant, 2,3-epoxypropyltrimethyl ammonium chloride was increased to 9.3 g. equivalent to a calculated DS of 0.1 which resulted in unusual properties of gelatinization and rheology. The product thickened to a creamy consistency in 2 parts of water at room temperatures; at 19 parts of water (5% solids) it swelled to a soft paste at 37° C. and to complete gelatinization and almost complete granule rupture at 65° C. When cooked to 80° C. and slowly cooled, this paste at 5% solids showed the following rheology:

|  | By Brookfield Viscometer at— | | | |
| --- | --- | --- | --- | --- |
|  | 6 r.p.m. | 12 r.p.m. | 30 r.p.m. | 60 r.p.m. |
| At 65.5° C, cps | 7,000 | 4,400 | 2,500 | 1,650 |
| At 20° C and 24 hrs. old, cps | 12,500 | 8,200 | 4,800 | 3,000 |

It will be noted that although the viscosities of the cold paste closely resemble those of Example I, the hot viscosities are considerably greater. The cationic rating was 90⊕.

Example III

The proportions and procedures of Example I and II were repeated except that the fluid reaction medium was n-heptane, the proportion of etherizing reactant 5 g. (equivalent approximately to a DS of 0.05) and the reaction time 8 minutes to a temperature of 49° C. Cationic activity and rheological properties approximated those of Example I.

Example IV

A series of 8 100 g. batches of tapioca flour were etherized according to the proportions and procedures of Example III except that the fluid reaction medium was CCl$_4$, and that the reaction periods varied from 3½ to 4½ minutes to a temperature of 52° C. After filtering and drying, the batches were blended to a combined yield of 901.5 g. out of a theoretical 922.0 g. or nearly 98%. The CCl$_4$ filtrate was re-used with small additions to the required volume. Cationic activity was determined practically on hand-sheets in a paper laboratory using 1% based on the pulp with favorable results, i.e., high ash retention in the sheet, good Mullen tests, etc.

Example V 30 g. of potato starch were stirred in a Waring Blendor with 300 ml. of CCl$_4$. Two milliliters of 50% NaOH (equivalent to 1.5 g. of NaOH) were added, followed immediately by 0.92 g. of 2,3-epoxypropyltrimethyl ammonium chloride in 50% aqueous solution, equivalent to a DS of about 0.03, and reacted for 2 minutes to a temperature of 38° C., before neutralization with 1.4 ml. of 77% sulfuric acid, filtered warm, and dried for 1 hr. under infra-red. The cationic activity was less than in Examples II and IV but was appreciable.

Example VI

The following example illustrates the formation of a tertiary nitrogen starch ether by a dialkyl amino alkyl halide.

50 g. of powdered wheat starch containing 10% moisture were stirred into 300 ml. of CCl$_4$ in a Waring Blendor to which was slowly added 3.3 ml. of 50% NaOH, equivalent to 2.5 g. NaOH, followed by 2.5 g. of 2-chlorotriethylamine hydrochloride in 50% aqueous solution equivalent to a DS of approximately 0.05. In 2 minutes of stirring the temperature rose to 38° C. when the slurry was filtered. The filter cake was bottled, warmed at 65° C. for 1 hour, dispersed in cold water and neutralized with HCl to a pH of about 4, since a tertiary nitrogen ether has the disadvantage, as compared to a quaternary nitrogen ether, of retaining its full positive charge only on the acid side. Cationic activity was appreciable but was inferior to Example IV.

Example VII

This example illustrates the reaction of a cereal starch with the preferred quaternary nitrogen amine in the form of its highly reactive epoxy compound.

The proportions and procedures of Example I were repeated with similar cationic activity and rheological properties, except that powdered cornstarch was used in place of tapioca.

I claim:

1. A process for making cationic etherified starch comprising suspending powdered, moist starch by means of agitation in an inert, water-immiscible fluid medium as the sole suspending medium, said inert, water-immiscible fluid medium consisting of a member selected from the group consisting of hydrocarbons and halohydrocarbons having a boiling point of 40 to 100°C., the amount of the starch in the fluid medium being such as to provide an easily agitated slurry, adding to said slurry during agitation an aqueous solution of at least 25% caustic alkali in an amount to provide 4 to 7% caustic on a dry basis based on the powdered starch, adding to said slurry during the agitation a cationic etherifying agent selected from the group consisting of halo tertiary amines and their hydrohalides, epoxy tertiary amine halides, halo quaternary ammonium halides and epoxy quaternary ammonium hydrohalides, in the form of a concentrated aqueous solution, the amount of the above-mentioned etherifying agent being sufficient to provide a calculated DS of from 0.01 to 0.1, continuing the agitation at a temperature of from 30 to 80° C. for from 1 minute to 1 hour, discontinuing the agitation, separating the cationic etherified powdered starch from the fluid medium, and drying the product, the total amount of water including that initially present in the powdered starch and that added with the caustic and the etherifying agent being not more than the powdered starch will take up and hold while still remaining in its original discrete granular form.

2. A process for making cationic etherified starch, which comprises suspending moist, powdered starch by means of agitation in an inert, water-immiscible fluid medium as the sole suspending medium, said inert, water-immiscible fluid medium consisting of a member selected from the group consisting of hydrocarbons and halohydrocarbons having a boiling point of 40 to 100° C., the amount of the starch in the fluid medium being such as to provide an easily agitated slurry, adding to said slurry during agitation an aqueous solution of at least 25% caustic alkali in an amount to provide 4 to 7% caustic on a dry basis based on the powdered starch, adding to said slurry during the agitation a cationic etherifying agent selected from the group consisting of halo tertiary amines and their hydrohalides, epoxy tertiary amine halides, halo quaternary ammonium halides and epoxy quaternary ammonium hydrohalides, in the form of a concentrated aqueous solution, the amount of the above-mentioned etherifying agent being sufficient to provide a calculated DS of from 0.01 to 0.1, continuing the agitation at a temperature of 30 to 80° C. for from 1 minute to 1 hour, neutralizing substantially all of the caustic by adding glacial acetic acid during agitation, discontinuing the agitation, separating the cationic etherified starch from the fluid medium, and drying the product, the total amount of water including that initially present in the starch and that added with the caustic, the etherifying agent and the acid being not more than the starch will take up and hold while still remaining in its original discrete granular form.

3. The process of claim 2 wherein the cationic etherifying agent is 2,3-epoxypropyltrimethyl ammonium chloride.

4. The process of claim 3 wherein the starch is tapioca flour.

5. The process of claim 3 wherein the starch is corn starch.

References Cited by the Examiner

UNITED STATES PATENTS

| | | | |
|---|---|---|---|
| 2,623,042 | 12/1952 | Vaughan | 260—231 |
| 2,744,894 | 5/1956 | Benedict et al | 260—233.3 XR |
| 2,813,093 | 11/1957 | Caldwell et al. | 260—233.3 |
| 2,876,217 | 3/1959 | Paschall | 260—233.3 |
| 3,070,594 | 12/1962 | Harris et al. | 260—233.3 |
| 3,135,739 | 6/1964 | Hjermstad et al. | 260—233.3 |

WILLIAM H. SHORT, *Primary Examiner.*

JAMES A. SEIDLECK, LOUISE P. QUAST, *Examiners.*

E. C. EDWARDS, *Assistant Examiner.*